United States Patent
Brekelbaum

[11] 3,944,203
[45] Mar. 16, 1976

[54] OXIDATION CUTTING WORK SUPPORT MEANS

[76] Inventor: Erwin C. Brekelbaum, 6831 N. Neil Place, Glendale, Wis. 52309

[22] Filed: Dec. 26, 1974

[21] Appl. No.: 536,420

Related U.S. Application Data

[63] Continuation of Ser. No. 420,512, Nov. 30, 1973, abandoned.

[52] U.S. Cl............ 269/296; 266/23 R; 269/321 A
[51] Int. Cl.².................................. B23Q 3/00
[58] Field of Search.......... 248/346; 266/23 R, 23 K; 269/296–301, 309, 321 A; 317/140.4, 351

[56] References Cited
UNITED STATES PATENTS

| | | | |
|---|---|---|---|
| 2,443,804 | 5/1969 | Roder | 266/23 K |
| 2,890,883 | 6/1959 | Brookhouser | 269/296 |
| 3,188,078 | 6/1965 | Peterson | 269/319 |
| 3,666,249 | 5/1972 | MacLeod | 266/23 R |
| 3,687,433 | 8/1972 | Bode | 266/23 R |
| 3,743,259 | 7/1973 | Hennelly | 266/23 R |
| 3,743,260 | 7/1973 | Alleman | 266/23 R |
| 3,777,602 | 12/1973 | Youra | 269/297 |

*Primary Examiner*—Roy Lake
*Assistant Examiner*—Mark S. Bicks
*Attorney, Agent, or Firm*—Burns, Doane, Swecker & Mathis

[57] ABSTRACT

A support for a material being cut in an oxidation cutting operation comprising a stanchion and a tip connected to and projecting above the stanchion to contact and support a material being cut. In cross section the tip is characterized by angled sides which extend upwardly and inwardly from a base to an apex which contacts the underside of the material being cut. Such a configuration minimizes direct impingement of the oxidation stream of the cutter upon the tip and directs molten material flowing from the kerf away from the support.

17 Claims, 6 Drawing Figures

OXIDATION CUTTING WORK SUPPORT MEANS

This is a continuation, of application Ser. No. 420,512, filed Nov. 30, 1973, now abandoned.

BACKGROUND OF THE INVENTION

This invention relates generally to a support for material being cut in a flame cutting operation. More specifically, the invention relates to a stable support comprised of a vertically upright stanchion, and a removable tip. The tip is configured to direct molten materials flowing from a kerf cut in the material away from the stanchion, to minimize direct impingement of the cutter flame upon the stanchion and to quickly dissipate localized heat developed at the tip.

A work support of the type contemplated by the present invention may enjoy a broad spectrum of industrial applicability in supporting varient materials being cut by either gas, plasma, electronic beam, or arc torches (hereafter called oxidation cutting). Of course, the invention need not be limited to such applications and may even be employed by a home craftsman using a conventional manual acetylene torch or other similar device to cut a material. As suggested, however, the invention may be used to its greatest advantage in an industrial environment wherein cutting operations must be performed in the course of a manufacturing process.

Many devices of the prior art, employed to support materials being flame cut or otherwise treated by heat of high intensity, are subject to this type of slag buildup on the surface of the support in contact with the material being treated. In a process for cutting metals, molten material flowing from a kerf being cut in the metal may solidify into a substance which may be referred to as slag. The slag may flow from the kerf onto an underlying support and form an encrustation on the support. As a consequence of such slag accumulation the surface supporting the material becomes irregular and thus incapable of supporting the material being treated with accuracy or stability. It would therefore be desirable to provide a support for materials being flame cut or otherwise treated by heat of high intensity, wherein any slag formed incident to the heating process would be directed away from the support and in particular away from the portion of the support contacting the material being treated.

Other devices in the prior art, for supporting materials being flame cut or otherwise treated with heat of high intensity, may be destructively oxidized in the course of the heat treatment. Such a phenomenon is particularly a problem in cutting operations in which the support is directly exposed to the heat of the flame or arc. It will be appreciated that the larger the portion of the support exposed to the flame or arc and the longer the support is exposed to the flame or arc, the greater the opportunity for oxidation. It would therefore be highly advantageous to provide a support wherein direct impingement upon the support by a flame or arc would be minimized both with respect to the portion of the support impinged and the duration of the exposure.

Still other devices of the prior art may support the material being treated but may not do so in a manner which affords sufficient lateral or vertical stability. With regard to lateral stability, it may be appreciated that in an industrial process employing a cutting device guided by a template and in which accuracy is required, any lateral movement of the workpiece whether by lateral vibration or deflection of the supports will diminish the accuracy of the operation. With regard to vertical stability, those familiar with gas or arc welding or cutting will appreciate that such operations may be relatively sensitive to fluctuations in arc length. Therefore, if materials being treated are supported in such a way as to cause variations in arc length, the cutting or welding operation may be rendered less effective. It would therefore be desirable to provide a support for a workpiece wherein lateral and vertical instability are minimized.

A further difficulty, encountered in prior art devices resides in a tendency for some supports to disrupt a cut being made in a material at points of contact between the support and the workpiece. In a cutting operation, the acetylene heating flame and the oxidizing jet of oxygen must fully penetrate the material being cut. This full penetration allows the material to be fully heated to the temperature necessary to allow oxidation and permits the oxidizing jet to oxidize and blow molten material out of the resulting kerf through the full thickness of the material. When such a cut is attempted through material supported by an underlying support of at least some of the prior art, the acetylene flame does not fully heat the material to the oxidizing temperature and the oxidizing jet may not fully oxidize and blow out material from this portion of the kerf. Furthermore, slag resulting from a cutting operation may be prevented from freely flowing from the kerf, and thus solidly in the kerf. It would therefore be desirable to provide a support for material being cut in which the tendency to block the arc or flow of slag from the kerf is minimized.

A further problem which may characterize certain devices of the prior art resides in the inability of these devices to adequately dissipate heat from the workpiece while maintaining sufficient durability to avoid damage incident to use in an industrial environment. It will be appreciated that in certain materials being flame cut or otherwise treated with heat of high intensity, it may be desirable to rapidly conduct heat developed in the area of the heat treatment through the support in order to prevent or minimize warping of the material. Materials capable of rapidly dissipating heat however are typically rather soft and thus do not possess the properties necessary to avoid damage in the course of rough industrial use. It would therefore be highly desirable if a support for materials could be provided which would rapidly dissipate heat from the area of the heat treatment and yet be sufficiently tough to avoid damage in the course of rough industrial use.

An additional difficulty which appears in devices of the prior art resides in the fact that these devices may not be easily or economically replaceable. If a support is expensive or difficult to remove and replace, the support may detract from the overall flexibility and efficiency of the manufacturing process.

OBJECTS AND BRIEF SUMMARY OF THE INVENTION

Objects

In light of the foregoing it is a general object of the invention to provide a support for a material being flame cut or otherwise treated by heat of high intensity intended to obviate or minimize problems of the type previously noted.

It is a particular object of the invention to provide a novel support, for material being cut in a flame cutting operation, which is configured to direct slag away from the support and avoid the buildup or encrustation of slag on the support.

It is another object of the invention to provide a novel support, for material being cut in a flame cutting operation, which is configured to minimize oxidation incident to heat developed in the cutting operation.

It is yet another object of the invention to provide a novel support for material being cut in a flame cutting operation which provides stable and accurate lateral and vertical support for the material.

It is still another object of the invention to provide a novel support for material being cut in a flame cutting operation which supports the material in a manner which allows full penetration of the material, and thereby does not disrupt the continuity of the cut.

It is a further object of the invention to provide a support for material being cut by a flame cutting operation which is sufficiently durable to resist damage incident to use in an industrial environment while concomitantly being capable of relatively rapid dissipation of heat developed incident to the cutting operation.

It is likewise an object of the invention to provide a novel support for material being cut by a flame cutting operation which may be easily and economically removed, replaced, or relocated.

Brief Summary

A support for a material being cut in a flame cutting operation according to a preferred embodiment of the invention intended to accomplish at least some of the foregoing objects is comprised of a stanchion and a tip connected to and projecting above the stanchion to contact and support a material being cut. In cross section the tip is characterized by angled sides which extend upwardly and inwardly from a base to an apex which contacts the underside of the material being cut. Such a configuration minimizes direct impingement of the flame of the cutter upon the tip and directs molten material flowing from the kerf away from the support.

THE DRAWINGS

Other objects and advantages of the present invention will become apparent from the following detailed description taken in conjunction with the accompanying drawings, wherein.

DETAILED DESCRIPTION

Figure 1:
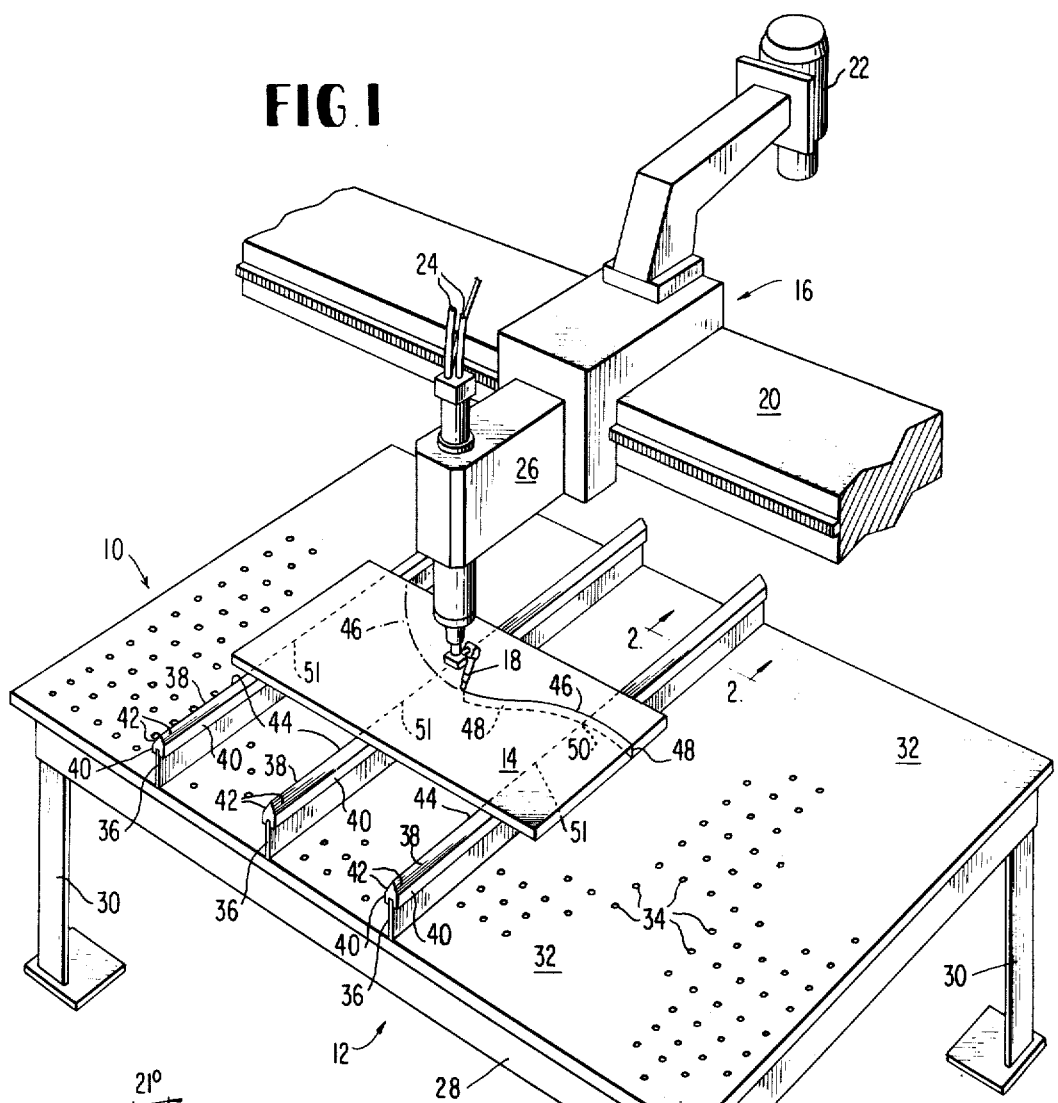
FIG. 1 is a perspective view showing the general relation of a support according to a preferred embodiment of the invention to a workpiece and a typical cutting apparatus.

Referring to FIG. 1 of the drawings, one embodiment of the invention 10 can be seen generally located relative to a workpiece 14 and a conventional cutting apparatus 16. The cutter 16 may be of any conventional design and for purposes of illustration has been shown to be of the type in which a torch 18 is translated along a carriage 20, and transversely thereto along a suitable track, not shown in the interests of simplicity, to make a cut of a desired configuration in a workpiece. Movement along the carriage 20 and the track may be controlled by a control pod 22 which may employ a light beam and associated photoelectric cell to follow a template. In the interest of simplicity the template has not been shown. Of course any number of control mechanisms may be used; the light beam and photoelectric cell is simply exemplary. Electricity or gas may be supplied to the cutting torch 18 through conduits 24 disposed in the head 26.

A table forming an aspect of the invention is comprised of a rectangular frame 28 supported by vertical legs 30. The table top 32 is comprised of a planar surface characterized by a matrix of apertures 34 arranged, as illustrated, at the vertices of equal adjacent rectangles. The significance of these apertures will be described more fully hereinafter.

The invention, which may be seen in FIG. 1 is comprised of vertical stanchions 36, the uppermost portions of which carry tips 38. As illustrated, a stanchion 36 may extend transversely across substantially the full width of the table top 32, and underly and support a coextensive tip 38.

The workpiece 14 rests on the apex of the several stanchions and tip assemblies while a cutting or other heat treating operation is performed by the cutting apparatus 16. The underside of the workpiece 14 can be seen to be contacted by apexes 44 of the tips 38 at what may be termed lines of contact 51 which may provide continuous support across the full width of the workpiece. This may preclude any possibility of warping due to insufficient support and also may insure that if the work is cut into multiple pieces each will be adequately supported and will remain stationary. So long as a portion of the workpiece is contacted by a length of at least two of the tips 38, it should remain in a stationary condition even though severed from the main portion of the workpiece 14.

As illustrated, the arc formed by the torch 18 cuts the workpiece 14, for instance, along the line 46, guided by the control pod 22 and associated template. In cutting the workpiece, the torch leaves a kerf as indicated at 48. It will be noted that the kerf 48 intersects the tip 38 at a point 50 at which an apex 44 contacts the underside of the workpiece 14.

Figure 2:
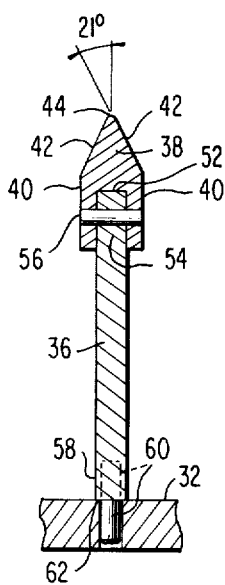
FIG. 2 is a transverse sectional view taken along section line 2—2 in FIG. 1.

FIG. 2 comprises a transverse sectional view of the invention taken along the lines 2—2 of FIG. 1. As illustrated, the invention provides a support for material being cut which is comprised of a vertical stanchion 36 which may extend longitudinally across substantially the full width of the table. The uppermost portion of the stanchion carries a tip 38 coextensive, at least in part, with the stanchion 36. As illustrated, the tip 38 is characterized by parallel, vertical, planar sides 40 and converging planar surfaces 42 which intersect at an apex 44. The lowermost portion of the tip 38 is longitudinally morticed to provide a longitudinally extending slot 52 which snugly receives the uppermost portions 54 of the stanchion 36. It should be noted that the overlapping relation between the tip and the uppermost portion of the stanchion increases the ability of the support to resist lateral flexure. In this way the stability of the support against lateral buckling under the load of a workpiece may be increased.

Transversely of the tip 38 and the uppermost portion 54 of the stanchion 36 is a pin 56 a plurality of which secures the tip 38 to the stanchion 36 at suitable longitudinal intervals. The pin 56 is of a type which may be removed with relative ease to allow replacement of the tip 38 if desired. It should be noted in this regard that any suitable fastener such as a nut and bolt or a rivet could be employed to secure the tip 38 to the uppermost portion 54 of the stanchion 36. It is important, however, that the pin 56 or other fastener be removable with relative ease in order that the tip 38 may be easily and economically removed and replaced.

The lowermost portion 58 of the stanchion 36 carries a plurality of pegs 60 disposed along the longitudinal extent of the stanchion 36 at intervals which coincide with the spacing between the apertures 34 provided in the table top 32. It will be noted that the pegs 60 fit snugly in the apertures 34 and that the apertures are fully covered by overhanging portions 62 of the stanchion 36. By virtue of the snug fit of the pegs 60 in the apertures 34 and the transverse breadth of the stanchion 36, slag may be excluded from the apertures 34 and the lowermost portion 58 of the stanchion 36 may be firmly secured to the table top 32. It will be further appreciated that the pin and aperture arrangement allows the invention to be easily removed from the work table 12 and relocated thereon. This capability renders the invention and thereby the overall cutting process more flexible and versatile.

It will be further noted from FIG. 2 that the support is of relatively short vertical height. The combination of the relatively short vertical height, the relatively long longitudinal length, the firm securement of the lowermost portion of the stanchion, and the increased flexural rigidity of the uppermost portion of the stanchion renders the support relatively stable both horizontally and vertically. Horizontal instability in the form of vibration is minimized by the longitudinal extend of the stanchion 36 and the inherent damping qualities thereof. The horizontal displacement of the tip 38 and the stanchion 36 is minimized by firm securement of the lowermost portion of the stanchion to the table and the flexural rigidity of the stanchion and morticed tip. Vertical instability of the support is minimized by reason of the full support of all portions of the tip 38 by a coextensive portion of the stanchion 38. This coextensive support may render vibration and deflection in a vertical direction negligible. The longitudinal extend of the stanchion 36 beneath substantially the full width of the workpiece 14 minimizes the possibility of buckling of the stanchion due to the weight of the workpiece 14.

As indicated, the tip 38 is characterized by converging planar surfaces 42 which intersect at an apex 44 and optimumly subtending an angle of 42°. Such a configuration provides essentially line contact with the lowermost surface of the workpiece. Such an arrangement or one increased by a maximum of 5° enables the tip to shed slag or other molten materials which may flow from the kerf 48 of a cut 46 which may intersect the line contact established between the apex 44 and the workpiece 14 at a point 50 (see FIG. 1). It will be noted as well that, by means of the line contact provided by the intersecting surfaces 42, relatively little of the tip 48 may be impinged by the plane of the nozzle 18. It can be seen that the tip recedes rapidly from the apex 44 which contacts the workpiece and thus, only a very small portion may be exposed to the more intense portions of the flame. Other portions of the tip downstream from the flame are subjected only to the cooler portions of the flange. It will also be noted that in light of the essentially line contact of the tip 38 with the workpiece 14, any disruption of the continuity of the cut is minimized since the flame or oxidizing jet can fully penetrate the workpiece on either side of the line of contact 52.

It will be noted that, despite the line contact between the tip and the workpiece, the body of the tip 38 is relatively large in width compared to the stanchion 36. A relatively large amount of material is concentrated in an area adjacent the workpiece. The bulk of the tip renders it less susceptible to damage incident to use in an industrial environment and also affords optimal dissipation of heat from the area in which a cut may intersect the apex 44 of the tip 38. In other words, as suggested in connection with the discussion of FIG. 1, when a cut is made in the workpiece 14 which intersects a line of contact 52 between the workpiece 14 and the apex 44 of the tip 38, the workpiece and the tip may be exposed to intense heat. It may be desirable that the tip 38 be capable of dissipating such heat quickly. To this end, the invention provides a tip of considerable bulk to facilitate the dissipation of the heat.

The proper dissipation of heat, of course, depends on the composition as well as the configuration of the element dissipating the heat. In this regard, it has been found that an alloy of at least 95% copper and approximately 1% chromium possesses desirable characteristics for use as the tip 38 of the invention. It has been found that this composition resists oxidation by the flame or arc which may impinge upon the tip and also is capable of effectively dissipating the heat. Furthermore, such an alloy is sufficiently durable and resistant to damage to be suitable for use in an industrial environment.

Figure 3:
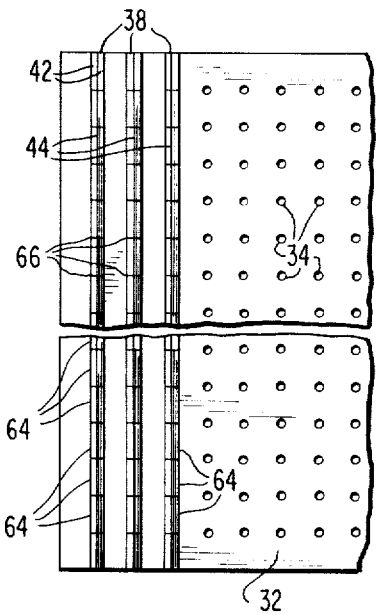
FIG. 3 is a plan view of one preferred arrangement of the invention.

FIG. 3 is a plan view of a preferred embodiment of the invention showing the tips 38 in relation to the apertured table 32. As more fully described in connection with FIG. 2, the tips 38 are characterized by converging planar surfaces 42 which intersect at an apex 44. The tips are secured to continuous longitudinally extending stanchions by suitable fasteners such as a pin 56 (see FIG. 2). The lowermost portions of the stanchions are provided with pegs which may be inserted in the apertures 34 of the table top 32 and which thereby provide considerable flexibility in the placement of the supports.

As illustrated in FIG. 3, three stanchions and the associated tips are arranged to align immediately adjacent one another. The invention is not, however, restricted to such a configuration and any number of rows of apertures may intervene between adjacent supports. For example, as illustrated, the three supports occupy the first three rows of apertures in the table counting from left to right. If desired, the third support could be moved to the extreme right to occupy the eighth row of apertures, in which case there would be five intervening rows of apertures between the second support and the third support. In addition, any one or all of these supports might be reoriented 90° to extend parallel to the length of the table 32 rather than the width as illustrated. It will be noted finally that the apexes of the supports provide only line contact with the work piece which may rest thereon. As indicated in connection with the discussion of FIG. 2, this is desirable for the reason that there is no disruption of the cutting of the work piece, minimal exposure to oxidation, minimal opportunity for the buildup or encrustation or slag on the tip, and continuous support of the material being cut.

It will be noted that the tips 38 are segmented into identical, basic units 64 which axially abut one another to form snug joints 66 in order to avoid any discontinuity in the line of support provided for the work piece by the apexes 44. The segmentation of the tips 38 into the basic units 64 facilitates mass production of the invention and allows replacement of short lengths of the tips 38 in the event of damage. In other words, if a short portion of a tip becomes damaged, only one or two sections need be removed and replaced rather than the full length of the tip. As will be more fully described in connection with the discussion of FIG. 5, all segments of a tip are connected to a single stanchion which underlies the full length of each tip. In other words, the stanchion coextends with the plurality of segments which comprise a full tip member.

Figure 4:
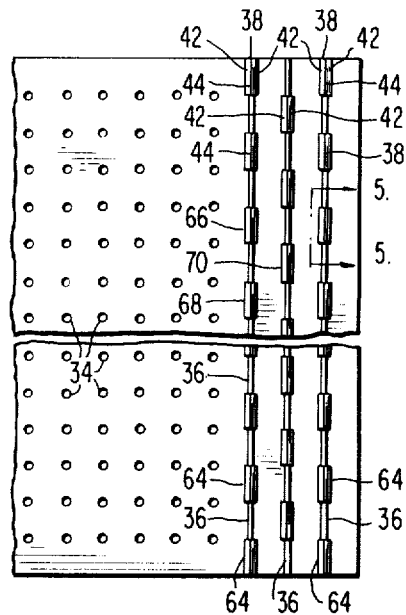
FIG. 4 is a plan view of an alternative preferred arrangement of the invention.

FIG. 4 is a plan view of an alternative embodiment of the invention showing a relation between a number of supports and the apertured table. As in the preferred embodiment discussed in connection with FIG. 3, the tips 38 are comprised of a plurality of identical basic units 64 which are removably secured as described in connection with FIG. 2 to continuous stanchions 36 which may extend across the width of the apertured table. The stanchions are secured to the apertured table by means of the pegs 60 which as illustrated in FIG. 2 are inserted into the apertures 34.

In contrast with the embodiment illustrated in FIG. 3, the FIG. 4 embodiment discloses segments 64 arranged on the stanchions 36 in a discontinuous fashion. The result of this discontinuous arrangement of the segments 64 on the stanchions 36 is to provide intermittent line contact by the apexes 44 of the segments 64 with the work piece. It will be noted that such an intermittent arrangement may further minimize the possibility that a cut may be disrupted by contact of a support beneath a portion of the material being cut and may likewise reduce the opportunity for oxidation of a tip and/or the encrustation of slag on a tip. This is due to the fact that the total contact of the tips with the material which would exist if the work piece were supported by the arrangement illustrated in FIG. 3 has been substantially reduced by the alternative embodiment of FIG. 4.

The particular alternating configuration shown in FIG. 4 was chosen in order to illustrate an arrangement of the segments which may afford particularly stable support for the work piece. It will be noted that the arrangement shown may provide a stable three point support for a work piece. If any two adjacent segments such as those located at 66 and 68 disposed on a single stanchion are considered in relation to an alternate segment such as 70 of an adjacent stanchion, it is clear that a work piece resting on the three segments will be supported by the lines of contact of the apexes of these three segments in three separate areas of the lower surface of the work piece. This type of support, which may be analogized to a tripod, may be advantageous for the reason that the possibility of disruption of a cut, oxidation of a tip, and/or encrustation of slag on a tip may be minimized while a stable mode of support is maintained. It will be noted as well that each stanchion of the embodiment illustrated in FIG. 4 continues to fully underly any work piece which might rest on the tips 38 and thus, essentially the same resistance to vertical and lateral instability as that discussed in connection with FIG. 2.

Figure 5:
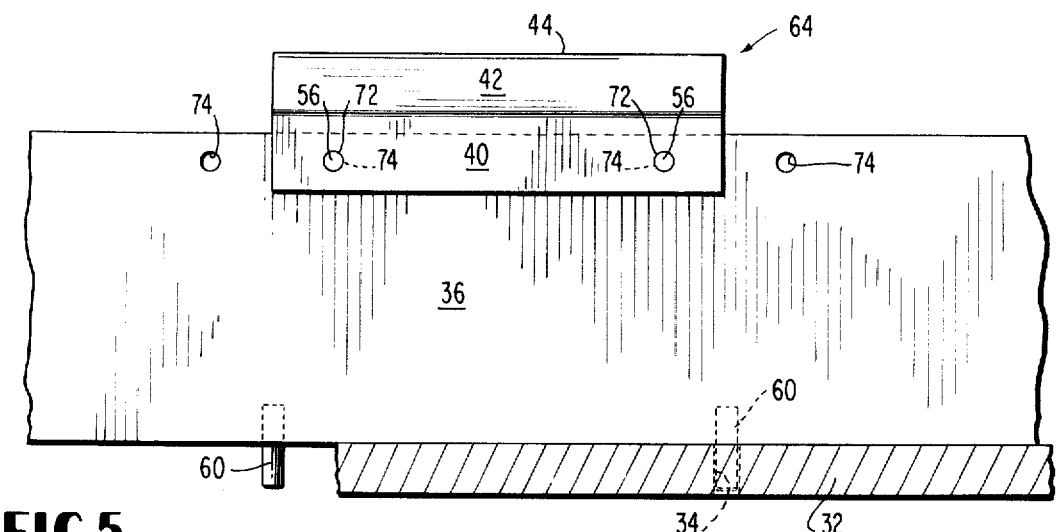
FIG. 5 is a partial sectional view taken along section line 5—5 of FIG. 4.

FIG. 5 is a fragmented sectional view taken along section lines 5—5 of FIG. 4 and illustrates the relation between the apertured table 32, a length of stanchion 36, and one of the segments 64 intermittently arranged on the stanchion. As indicated earlier, the segment 64 is one of a plurality of identical segments which comprise the tip 38 of a stanchion 36 upon which a work piece rests. As suggested by the discussion of FIGS. 1–4, the segment 64 has a vertical plane of symmetry which coincides with the vertical plane of symmetry of the stanchion 36. Thus, the segment 64 can be seen to be characterized by vertical planar sides 40 and converging planar surfaces 42 which intersect at an apex 44. A work piece may contact the apex 44 and thus, may be supported by the resulting line of contact. The segment 64 is removably secured to the stanchion 36 by means of suitable fasteners such as the pins 56. As indicated earlier, any suitable fastener such as a nut and bolt or a rivet which allows easy removal of the segment 64 from the stanchion 36 may be employed. The pins 56 extend through apertures 72 and 74 disposed in the segment and the stanchion, respectively. The apertures 74 are disposed in the stanchion 36 in any repeating pattern which allows the segments 64 to be secured to the stanchions 36 either as illustrated in FIG. 3, as illustrated in FIG. 4, or as desired by the user to allow any desired intermittent arrangement of the segments 64 on the stanchion 36.

As described earlier, the stanchion 36 is secured to the table 32 by means of pegs 60 which protrude from the lowermost portion of the stanchion and which may be inserted in the apertures 34 as desired. It can be seen that by providing the desired pattern of apertures in the stanchion 74 and the desired arrangement of pegs 60, a support may be provided which is quite versatile. Any intermittent or continuous arrangement of segments may be combined to provide a desired mode of contact with the work piece and each stanchion may be secured to the table as desired.

Figure 6:
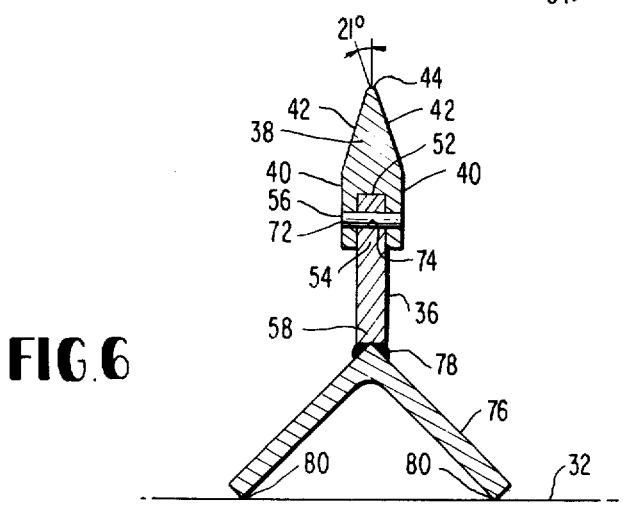
FIG. 6 is a transverse sectional view of an alternative preferred embodiment of the invention having a free standing, laterally movable base.

FIG. 6 is a transverse sectional view of an alternative embodiment of the invention. As in the case of the embodiment illustrated in FIG. 2, a tip member 38, characterized by parallel vertical planar sides 40 and converging planar surfaces 42, receives the uppermost portions 54 of a stanchion 36 in a longitudinally extending slot 52.

The tip 38 is secured to the stanchion 36 by means of a plurality of pins 56 which are inserted through apertures 72 and 74 in the tip and the stanchion respectively. As in the case of the embodiment of FIG. 2, the tip and stanchion arrangement just described provides an optimal configuration for effectively shedding slag, minimizing oxidation, and minimizing possible disruption of a cut; while concurrently providing for optimal dissipation of heat and the durability desired.

The embodiment of the invention illustrated in FIG. 6 is supported on the surface of the table 32 by means of a base 76 formed from angle iron to which the lowermost portion of a stanchion 56 is welded as at 78. The angle iron 76 underlies the full length of the stanchion 36 and therefore provides a structurally sound arrangement which is vertically and laterally quite stable. Indeed, it will be appreciated that the broadly spaced points of contact 80 between the legs of the angle iron 76 and the worktable 32 provide a laterally stable support which may resist tipping and vibration. Furthermore, it will be noted that the embodiment of FIG. 6 provides a very versatile support which may be oriented in any desired position on the table 32.

SUMMARY OF MAJOR ADVANTAGES

It will be appreciated that in providing a support for material being flame cut or otherwise treated by heat of high intensity according to the present invention, certain significant advantages are obtained.

In particular, the unique configuration of the tip of the support and more particularly, the angle subtended by the converging planar sides of the tip insures that slag is effectively shedded from the support to prevent slag build up on the tip.

Further, the configuration of the tip of the support minimizes exposure of the tip to oxidation incident to impingement by a cutting flame.

A further advantage resides in the fact that the support is secured to the work table and configured in a manner which affords lateral and vertical stability while maintaining versatility in placement of the support on the table.

By reason of the line contact provided between the work piece and the tip of the support, any disruption of a cut being made in the material is minimized.

Also quite important is the advantage gained by optimizing the configuration of the tip of the support to rapidly dissipate heat while concurrently providing for effective shedding of slag, minimization of oxidation of the tip and minimization of disruption of cuts being made in the material.

A further advantage resides in the optimization of the composition of the tip to afford a sufficiently durable tip for contacting the work piece while concurrently providing for maximum heat transfer.

Finally, the support is possessed of the advantage that segments of the tip may be easily replaced if damaged, or may be placed intermittently on the stanchion to provide any configuration of support desired.

In describing the invention, reference has been made to a preferred embodiment. However, those skilled in the art and familiar with the disclosure of the invention may recognize additions, deletions, substitutions, or other modifications which would fall within the perview of the invention as defined in the claims.

What is claimed is:

1. A material support for an oxidation cutting operation comprising:
    longitudinally extending stanchion means for operatively underlying and supporting, at least in part, material to be cut by an oxidation cutter, and
    longitudinally extending tip means operatively connected to said stanchion means and projecting above said stanchion means for supporting the material to be cut,
    said tip means in cross section having a recess in the bottom thereof for receiving a portion of said stanchion means, and angled side portions, said side portions extending from a base portion inwardly and upwardly from said base portion to define an upwardly directed acute vertex for contacting an underside of the material to be cut to minimize direct impingement of the oxidation stream upon said tip means and to direct molten material, from a kerf in the material to be cut, away from said tip means, and
    said tip means being constructed of material with a thermal conductivity greater than the thermal conductivity of said stanchion means and having a mass substantially greater than the mass of said portion of said longitudinally extending stanchion means to distribute and dissipate within said tip means hot spots generated upon said tip means by the oxidation cutter.

2. A material support for an oxidation cutting operation as defined in claim 1 wherein:
    the sides of said tip means subtend an angle of approximately 42°.

3. A material support for an oxidation cutting operation as defined in claim 1 wherein:
    said stanchion and said tip means are longitudinally coextensive to support said material to be cut in substantial line contact by said tip means.

4. A material support for an oxidation cutting operation as defined in claim 1 wherein:
    said tip means longitudinally extend in intermittent regular increments along said longitudinally extending stanchion means to support said material to be cut in intermittent, substantially line contact by said tip means.

5. A material support for an oxidation cutting operation as defined in claim 1 wherein:
    said tip means is composed of an alloy of copper and a hardening material in which the copper content of the alloy is equal to or greater than 95% of the alloy composition.

6. A material support for an oxidation cutting operation as defined in claim 5 wherein:
    said hardening material is comprised of chromium.

7. A material support for an oxidation cutting operation as defined in claim 6 wherein:
    the sides of the apex of said tip means subtend an angle of approximately 42°.

8. A material support for an oxidation cutting operation as defined in claim 1 wherein:
    said tip means is provided with a mortise in the base portion thereof which is dimensioned to intimately receive the uppermost portion of said stanchion means, and
    means extending through said base portion of said tip means and said uppermost portion of said stanchion means to releasably connected said tip means to said stanchion means.

9. A work table for supporting a material to be cut by an oxidation cutting operation comprising:
    a generally planar work surface;
    a plurality of vertical, longitudinally extending stanchion means positioned upon said work surface for operatively underlying and supporting material to be cut by an oxidation cutter; and
    a plurality of longitudinally extending tip means, at least one connected to each of said stanchion means and extending between said stanchion means and the material to be cut,
    each of said tip means in cross section having a recess in the bottom thereof for receiving a portion of the stanchion means to which such tip means is connected and having angled sides extending from a base portion upwardly and inwardly to define an upwardly directed acute vertex for contacting an underside of the material to be cut to minimize direct impingement of the oxidation stream upon said tip means and to direct molten material, from a kerf in the material to be cut, away from said tip means, and each of said tip means being constructed of material with a thermal conductivity greater than the thermal conductivity of said stanchion means and having a mass substantially greater than the mass of said longitudinally extending stanchion means to distribute and dissipate within said tip means hot spots generated upon said tip means by the oxidation cutter.

10. A work table for supporting a material to be cut by an oxidation cutting operation as defined in claim 9 wherein:

said plurality of stanchions are positioned in a substantially mutually parallel, equally spaced posture across said work surface, each of said stanchion means coextending with said at least one tip means connected thereto to support the material to be cut by a plurality of substantially line contacts by said tip means.

11. A work table for supporting a material to be cut by an oxidation cutting operation as defined in claim 9 wherein:

said plurality of stanchions are positioned across said work surface and each of said stanchion means is fitted with a plurality of tip means which are positioned in intermittent, regular increments along each of said stanchion means to support the material to be cut in a plurality of intermittent substantially line contacts by said tip means.

12. A work table for supporting a material to be cut by an oxidation cutting operation as defined in claim 11 wherein:

the intermittent tip means of each stanchion means are offset with respect to the intermittent tip means of adjacent stanchion means.

13. A work table for supporting a material to be cut by an oxidation cutting operation as defined in claim 9 wherein:

a plurality of apertures forming a regular matrix is disposed in said planar work surface; and a plurality of peg means extend downwardly from said stanchion means for snug insertion into said apertures to secure said stanchion means to said work table.

14. In a work table for supporting a material to be cut by an oxidation cutting operation, the work table including a stanchion for supporting in a horizontal position, material to be cut by the oxidation stream the improvement comprising:

tip means removably mounted on the stanchion to project above the stanchion for directly supporting the material to be cut, said tip means in cross section having a recess in the bottom thereof for receiving a portion of said stanchion, and upwardly and inwardly converging side portions forming an upwardly directed acute vertex for contacting an underside of the material to be cut to minimize direct impingement of the oxidation stream upon said tip means and to direct molten material, from a kerf in the material to be cut, away from said tip means, and said tip means being constructed of material with a thermal conductivity greater than the thermal conductivity of said stanchion and having a mass substantially greater than the mass of said portion of said longitudinally extending stanchion to distribute and dissipate within said tip means hot spots generated upon said tip means by the oxidation cutter.

15. In a work table as defined in claim 14 and further wherein the improvement comprises:

the sides of said tip means subtend an angle of approximately 42°.

16. In a work table as defined in claim 15 and further wherein the improvement comprises:

said tip means is composed of an alloy of copper and a hardening material in which the copper content of the alloy is equal to or greater than 95% of the alloy composition.

17. In a work table as defined in claim 16 and further wherein the improvement comprises:

said hardening material is comprised of chromium.

* * * * *